Patented July 14, 1936

2,047,571

UNITED STATES PATENT OFFICE 2,047,571

PROCESS FOR PREPARING IRON SULPHATE CHLORIDE

Alfred Anton, Eberstadt, Germany, assignor to Röhm & Haas, Aktiengesellschaft, Chemische Fabrik, Darmstadt, Germany No Drawing. Application May 29, 1935, Serial No. 24,053. In Germany May 31, 1934

4 Claims. (Cl. 23—87)

This invention relates to the preparation of a non-hygroscopic iron salt which is especially suitable for use in the tanning industry. It relates in particular to the preparation of a ferric sulphate chloride having the formula $FeSO_4Cl \cdot 6H_2O$.

In United States Patent No. 1,383,264 dated June 28, 1921 a process for preparing this salt by the treatment of ferric chloride with the proper amount of sulfuric acid in an aqueous solution and subsequent evaporation of the water under reduced pressure until the product contains 37% of water has been described. In the same patent a process of treating a solution of ferrous sulphate with chlorine and subsequent evaporation of the water to the point where the product contains 37% of water is also described.

It has now been found that the same product can be obtained by treating a finely ground mixture of solid anhydrous or substantially anhydrous ferrous sulphate and solid crystallized ferrous sulphate containing seven molecules of water with chlorine. The anhydrous and crystallized (hydrated) ferrous sulphate are mixed in such proportion that for every atom of iron present there are six molecules of water. By treating such a mixture of anhydrous or practically anhydrous and hydrated ferrous sulphate with chlorine a salt of the composition $FeSO_4Cl \cdot 6H_2O$ may be produced directly thus eliminating the necessity of evaporating a solution of that salt under reduced pressure until the residue contains the proper proportion of water.

This process is carried out at ordinary temperature preferably in a closed system under a slight superatmospheric pressure of chlorine. In place of anhydrous ferrous sulphate a technically anhydrous ferrous sulphate $FeSO_4 \cdot H_2O$ may be used to mix with the crystallized ferrous sulphate $FeSO_4 \cdot 7H_2O$.

This mixture may be illustrated by the following examples but it is not limited to the exact temperatures and pressures of chlorine shown as it may be otherwise practiced within the scope of the appended claims.

Example 1

Chlorine gas is introduced under a pressure of one to two atmospheres at 20–25° C. in a closed system into a mixture consisting of one mol. of solid anhydrous ferrous sulphate and six mols of solid crystallized ferrous sulphate. The chlorine is allowed to react with this mixture until all the ferrous iron has been oxidized to ferric iron. During the reaction the temperature may rise to about 40° C. The product is a greenish-yellow mass which may be poured into iron molds and allowed to solidify. It is then broken up into small pieces in which form it may be placed on the market. The yield of ferric-sulphate chloride corresponds to the theoretical.

Example 2

One mol of technically anhydrous ferrous sulphate ($FeSO_4 \cdot H_2O$) is mixed with five mols of crystallized ferrous sulphate ($FeSO_4 \cdot 7H_2O$) and the mixture finely ground. This mixture is placed in a closed apparatus and chlorine gas is admitted under superatmospheric pressure until all the ferrous iron is oxidized. The resulting mass is the same as is obtained according to Example 1.

I claim:

1. The process of preparing a non-hygroscopic salt of iron comprising treating a mixture of substantially anhydrous and crystallized ferrous sulphate ($FeSO_4 \cdot 7H_2O$) with chlorine, the anhydrous and crystallized ferrous sulphates being present in such proportion that for every atom of iron present there are six molecules of water.

2. The process of preparing ferric sulphate chloride ($FeSO_4Cl \cdot 6H_2O$) which comprises treating a mixture of one mol. of anhydrous ferrous sulphate and six mols of crystallized ferrous sulphate with chlorine.

3. The process of preparing ferric sulphate chloride ($FeSO_4Cl \cdot 6H_2O$) which comprises treating a mixture of one mol. of the monohydrate of ferrous sulphate ($FeSO_4 \cdot H_2O$) and five mols of crystallized ferrous sulphate ($FeSO_4 \cdot 7H_2O$) with chlorine.

4. A process as set forth in claim 1, where the substantially anhydrous ferrous sulphate contains not more than one molecule of water.

ALFRED ANTON.